United States Patent [19]

Tessler

[11] 4,153,585

[45] May 8, 1979

[54] STARCH ETHER DERIVATIVES AND PROCESS FOR THE PREPARATION THEREOF

[75] Inventor: Martin M. Tessler, Edison, N.J.

[73] Assignee: National Starch and Chemical Corporation, Bridgewater, N.J.

[21] Appl. No.: 903,712

[22] Filed: May 8, 1978

[51] Int. Cl.$^2$ .......................... C08L 3/02; C08L 3/08
[52] U.S. Cl. .................... 260/17.4 GC; 260/17.4 ST; 260/17.4 UC; 536/50
[58] Field of Search .............. 260/17.4 GC, 17.4 UC; 536/50

[56] References Cited

U.S. PATENT DOCUMENTS

| | | | |
|---|---|---|---|
| 2,837,511 | 6/1958 | Mantell | 536/43 |
| 2,837,512 | 6/1958 | Mantell | 536/43 |
| 3,135,738 | 6/1964 | Cushing | 536/47 |
| 3,823,100 | 7/1974 | Rothwell | 260/17.4 ST |
| 4,028,290 | 6/1977 | Reid | 260/17.4 GC |
| 4,060,506 | 11/1977 | Verbanac | 260/17.4 GC |
| 4,066,583 | 1/1978 | Spaulding | 260/17.4 UC |

OTHER PUBLICATIONS

Ind. Eng. Chem., 37, 201 (1945), Nichols et al.

*Primary Examiner*—Edward M. Woodberry
*Attorney, Agent, or Firm*—James & Franklin

[57] ABSTRACT

A novel starch ether derivative of which the crosslinking properties may be altered by adjusting the pH of the cook is prepared by reacting under controlled conditions a starch base in aqueous medium with an N-(alkoxymethyl)acrylamide wherein the alkoxy group contains 1-4 carbon atoms, and is preferably an isobutoxy group. The starch derivatives herein may be used as insolubilizing or strengthening agents in adhesives, coatings, and in other applications wherein controlled crosslinking is desirable.

10 Claims, No Drawings

STARCH ETHER DERIVATIVES AND PROCESS FOR THE PREPARATION THEREOF

BACKGROUND OF THE INVENTION

1. Field of the Invention:

The present invention relates to novel crosslinkable starch ether derivatives.

2. Description of the Prior Art:

It is well known in the art that starch derivatives containing pendant ethylenically unsaturated groups may be crosslinked to obtain coatings for various materials such as paper, textiles and polymers. Typical of such ethylenically unsaturated starch derivatives are acrylate esters, allyl ethers (see J. P. Radley, "Starch and Its Derivatives", 4th ed., 1968 and Ind. Eng. Chem., 37, 201 (1945)) and starch acrylamide ethers (see U.S. Pat. No. 4,060,506).

Because these starch derivatives do not appreciably crosslink when cooked in water at any pH, they must be induced to crosslink using infrared or ultraviolet radiation, chemical agents such as cobalt naphthenate, or free radical initiators such as, e.g., peroxides, persulfates, azo initiators, etc. The crosslinking reaction employing free radical initiators may take place using any conventional thermally- or irradiation-induced free radical polymerization technique.

Induced crosslinking of starch derivatives as described above, however, has many disadvantages. For example, when crosslinking is induced by free radical initiators, the reaction is very difficult to control. In addition, many of the applicable free radical initiators will actually attack the starch, resulting in starch degradation. Allyl starch ethers, which can be crosslinked with the application of ultraviolet and infrared radiation as well as by free radical initiation, yield, upon crosslinking, coatings which have inferior properties such as non-homogeneity, inflexibility and poor water resistance. Consequently, there is a need in the art for a starch derivative which will crosslink upon damand without requiring inducement by irradiation or a chemical agent such as a free radical initiator.

N-(Alkoxymethyl)acrylamides are reactive crosslinking monomers which have been used as reagents for a number of applications. It is known that crosslinking through the N-(alkoxymethyl)amide group with amine, amide, hydroxyl or carboxyl groups is achieved under acidic conditions and/or elevated temperatures. In addition, it is known that N-(iso-butoxymethyl)acrylamide will condense directly with cellulose to split out alcohol to form a cellulose ether derivative having ethylenically unsaturated groups (see U.S. Pat. No. 2,837,512). An analogous starch derivative, of which the following formula is representative (but not definitive):

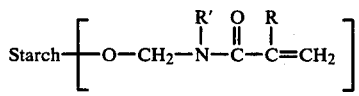

wherein R and R' are monoorgano or hydrogen groups, is typically prepared by reacting a starch base with the appropriate N-(hydroxymethyl)acrylamide reagent at a pH less than 5 in the presence of an acid catalyst and polymerization inhibitor (see U.S. Pat. No. 4,060,506). As mentioned above, however, these derivatives require inducement in order to be crosslinked for use in coatings, etc. Although reaction of starch with acrylamide or N-alkyl-substituted acrylamide derivatives has been disclosed (see U.S. Pat. No. 3,135,738), reaction of a starch base specifically through the ethylenic linkage of N-(alkoxymethyl)acrylamides has not been investigated.

Accordingly, it is an object of the present invention to provide a novel crosslinkable starch ether derivative having no pendant ethylenically unsaturated groups.

It is a further object to provide a process for preparing a starch ether derivative which is crosslinkable at low pH in the absence of irradiation or a free radical initiator.

SUMMARY OF THE INVENTION

The above and related objects are achieved in preparing a novel starch ether derivative by reacting a starch base in water at pH 11–13 for 1–40 hours with about 1–100% by weight, based on dry starch, of N-(alkoxymethyl)acrylamide wherein the alkoxy group has 1 to 4 carbon atoms, with subsequent isolation of the resultant starch derivative.

In one preferred embodiment of this process, the reagent used is N-(iso-butoxymethyl)acrylamide. In another preferred embodiment the amount of reagent used is 2–10% by weight. For granular starches the reaction is preferably carried out at 40°–55° C. for 10–24 hours, and for non-granular starches, at 50°–70° C. for 10–24 hours.

The starch ether derivatives of this invention are crosslinked without inducement by chemical initiators or irradiation. Because no free radical initiators are required to induce crosslinking, the starch molecule remains intact after crosslinking with no degradation occurring. The product of this invention is obtained as a slightly crosslinked starch derivative, the crosslinking properties of which can be altered by varying the pH of the starch cook. The derivatives herein may be used in any applications wherein it is desirable to employ a crosslinkable starch ether derivative. Typical applications include coatings and sizes for paper, textiles, glass, and the like; use in corrugating adhesives; etc.

DESCRIPTION OF THE PREFERRED EMBODIMENTS

The applicable starch bases which may be used in preparing the starch ether derivatives herein may be derived from any plant source including corn, potato, sweet potato, wheat, rice, sago, tapioca, waxy maize, sorghum, high amylose corn, or the like. Also included are conversion products derived from any of the latter bases including, for example, dextrins prepared by the hydrolytic action of acid and/or heat; oxidized starches prepared by treatment with oxidants such as sodium hypochlorite; fluidity or thin-boiling starches prepared, for example, by enzyme conversion or mild acid hydrolysis; and derivatized starches such as ethers and esters. If the desired starch blend is to be a granular starch, then obviously the initial starting material must be in granular form. It is to be noted that the products of this invention may also be prepared employing gelatinized starches, i.e., non-granular starches. The preferred starches for use herein are in granular form.

The N-(alkoxymethyl)acrylamide reagent which reacts with the starch base in the process of this invention is of the formula:

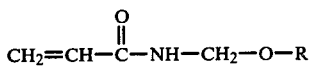

wherein R is an alkyl group having 1-4 carbon atoms. The compounds represented by the above formula may be prepared by procedures well known and described in the literature. A general method for their preparation, described in J. Org. Chem., 28, 3458 (1963), involves reacting acrylamide with paraformaldehyde and the desired alcohol. For example, if N-(methoxymethyl)acrylamide is desired, the alcohol used is methanol. The preferred reagent for use herein is N-(iso-butoxymethyl)acrylamide because it is commercially available and is the least toxic and the least difficult to handle of all the N-(alkoxymethyl)acrylamide compounds applicable herein.

The reaction of starch with the N-(alkoxymethyl)acrylamide reagent to give the novel starch ether derivatives of this invention may be represented by the general equation given below:

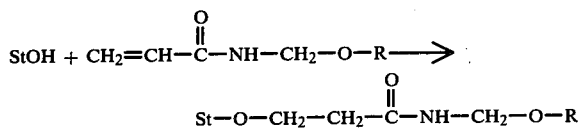

wherein St-O-H is the starch molecule and R is an alkyl group having 1-4 carbon atoms. The products of this reaction also contain a small amount of crosslinkages, the nature of which will be discussed hereinbelow.

The practitioner will recognize that the starch molecule is a polymer which contains many anhydroglucose units, each having three free hydroxyl groups (except the non-reducing end glucose units, which contain four free hydroxyl groups) which may react with the N-(alkoxymethyl)acrylamide reagent. Thus, the number of such displacements or the degree of substitution (D.S.) will vary with the particular starch, the ratio of reagent to starch and, to some extent, the reaction conditions. Furthermore, since it is known that the relative reactivity of each of the hydroxyl groups within the anhydroglucose unit is not equivalent, it is probable that some will be more reactive with the reagent than others.

In the process for preparing the starch derivatives herein, the starch base is first slurried in water containing a common base such as sodium hydroxide, potassium hydroxide, ammonium hydroxide, calcium hydroxide, or the like, to attain a pH of 11-13, and preferably 12.0-12.5. To the alkaline starch slurry thus formed is added, with stirring, the N-(alkoxymethyl)acrylamide reagent in an amount ranging from 1 to 100% by weight, based on dry starch, depending on the starch base used and the degree of substitution desired in the end product. For many applications, the preferred amount to be used is 2-10% by weight.

After all of the reagent has been added, the reaction mixture is agitated and heated to a temperature of 20°-95° C. for non-granular starches and 20°-60° C. for granular starches. It will be recognized by the practitioner that use of temperatures above about 60° C. with granular starches will result in granule swelling and filtration difficulties or gelatinization of the starch. It is preferred to employ reaction temperatures of 50°-70° C. for non-granular starches and 40°-55° for granular starches.

Particularly when granular starches are employed, it is advantageous to carry out the reaction in the presence of sodium sulfate in amounts of from about 10-40% by weight of dry starch. The presence of sodium sulfate acts to suppress swelling of the starch and gives a more filterable product. The sodium sulfate is not used in calcium hydroxide catalyzed reactions.

The time required for reaction will vary from about 1 to 40 hours, depending on such factors as the amount of reagent employed, the temperature, the pH, the scale of the reaction, etc. In general, the preferred range of reaction time is from 10 to 24 hours.

After completion of the reaction, the pH of the reaction mixture is preferably adjusted to a value of from 5.0 to 7.0 with any common acid such as hydrochloric acid, sulfuric acid, acetic acid, and the like. Such acids may be conveniently added in the form of a dilute aqueous solution.

Recovery of the resulting starch product may be readily accomplished, with the particular method employed being dependent on the form of the starch base. Thus, a granular starch may be recovered by filtration, washed with water to remove any residual salts, and dried. The washed granular starch products may be drum dried or spray dried, or gelatinized and isolated by alcohol precipitation or freeze drying. If the starch product is non-granular, it can be purified by dialysis to remove residual salts and isolated by alcohol precipitation, freeze drying, or spray drying.

It is to be noted that the starch derivatives herein are crosslinked as determined by cooking in boiling water. The crosslinking properties of the derivatives can be altered by adjusting the pH of the cook. While not adhering to any particular theory, it is believed that two competing types of crosslinking reactions are occurring, one favored at neutral or alkaline pH and the other at low (acidic) pH. The crosslinking reaction at low pH can be represented as follows:

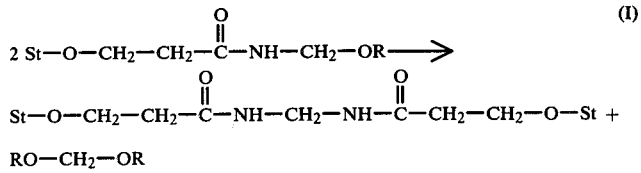

The reaction which is occurring at neutral or alkaline pH may be caused by the presence of impurities in the reagent and/or by reaction of the starch with the N-(alkoxymethyl)acrylamide substituent. The latter type of crosslinking reaction can be represented as follows:

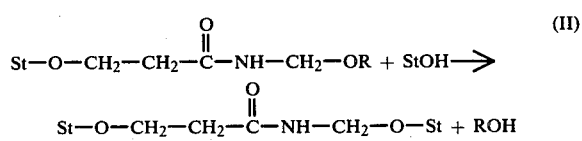

Crosslinkages formed by reaction (II) appear to be stable when the starch is cooked at neutral or alkaline pH, and the starch products of this invention will ordinarily contain a small amount of this type of crosslinking. In some cases, depending on the starch base and level of reagent treatment, the cooked starch settles out of solution. When the starch is cooked at pH 3.0, however, these crosslinkages are substantially removed, and the starch cook develops properties characteristic of a starch crosslinked after being dispersed. Thus, a homogeneous, viscous dispersion of the starch product is obtained, with no settling of the starch out of solution. Depending on the starch base used, the dispersions produced have strong sets (resistance to flow) or are in the form of soft gels. It is possible that an equilibrium is set up at pH 3 wherein the crosslinking reaction (II) occurs in a reversible manner.

The starch ether derivatives designated as Nos. 11-15 in Table II were prepared as follows:

A total of 50 parts tapioca starch was suspended in a solution of 15 parts sodium sulfate and 1.5 parts sodium hydroxide in 76.5 parts water to give a pH of 12.2. Then 5.0 parts N-(iso-butoxymethyl)acrylamide were added and the resulting mixture agitated at 45° C. for the number of hours indicated in Table II. After completion of the reaction, the pH was lowered to 6.0 with 9.5% aqueous hydrochloric acid and the product recovered by filtration, washed with water and ethanol, and dried. The nitrogen content of the products was determined as in Example I. The results, summarized in Table II, indicate that the reaction efficiency is increased with increasing reaction time, all other factors being equal.

TABLE I

| Starch Derivative No. | Starch Base | Amount of N-(iso-butoxymethyl)acrylamide (% by weight, based on starch) | Reaction Temperature (°C.) | Nitrogen Content (% by weight) |
|---|---|---|---|---|
| 1 | Waxy maize previously treated with 7.0% propylene oxide and 0.014% phosphorous oxychloride | 10 | 40° | 0.40 |
| 2 | High amylose corn starch (55% amylose, by weight) | 10 | 40° | 0.42 |
| 3 | Corn starch (oxidized by reaction with NaOCl to 75 fluidity) | 10 | 40° | 0.33 |
| 4 | Potato starch | 10 | 40° | 0.48 |
| 5 | Corn starch* | 7.5 | 20° | 0.11 |
| 6 | Corn starch* | 7.5 | 40° | 0.20 |
| 7 | Waxy maize | 7.5 | 20° | 0.19 |
| 8 | Waxy maize | 7.5 | 40° | 0.34 |
| 9 | Waxy maize | 7.5 | 50° | 0.46 |
| 10 | Waxy maize | 3.0 | 50° | 0.20 |

*The preparations with corn starch employed 125 parts water and 1.5 parts sodium hydroxide per 100 parts starch instead of 150 and 3.0 parts, respectively.

The following examples will more fully illustrate the embodiments of this invention. In the examples which follow, all parts and percentages are given by weight and all temperatures in degrees Celsius unless otherwise noted.

EXAMPLE I

This example illustrates the preparation of the starch ether derivatives of this invention.

The starch ether derivatives designated as Nos. 1-10 in Table I were prepared as follows:

In a total of 150 parts water were dissolved 3.0 parts sodium hydroxide and 30 parts sodium sulfate. To this solution were added 100 parts of the indicated starch base to give a suspension having a pH of 12.3. The indicated amount of N-(iso-butoxymethyl)acrylamide was then added to the resulting suspension and the mixture agitated at the designated temperature for 16 hours. After completion of the reaction, the reaction mixture was acidified with either dilute aqueous hydrochloric or sulfuric acid to pH 6.0, and the resulting product recovered by filtration, washed with water, and dried. The nitrogen content of each starch derivative was then determined by the Kjeldahl method, which is a method well known in the art for measuring amounts of nitrogen. The results are summarized in Table I.

EXAMPLE II

This example illustrates the effect of increasing reaction time on the starch ether derivatives of this invention.

TABLE II

| Derivative No. | Reaction Time (hours) | Nitrogen Content (% by weight) |
|---|---|---|
| 11 | 2 | 0.14 |
| 12 | 4 | 0.20 |
| 13 | 6 | 0.26 |
| 14 | 7 | 0.29 |
| 15 | 24 | 0.51 |

EXAMPLE III

This example illustrates the preparation of the starch ether derivatives of this invention using a gelatinized starch base.

A total of 40 parts of a waxy maize starch which had been acid-converted to a degree known in the trade as 85 fluidity was added to 160 parts water. The resulting suspension was heated by means of a steam bath at 100° C. for 15 minutes and cooled to 90° C. to effect gelatinization. The pH was then raised to 12.3 by adding 2.4 parts of a 50% aqueous sodium hydroxide solution. A total of 8.0 parts of N-(iso-butoxymethyl)acrylamide was then added slowly with agitation. The resulting reaction mixture was agitated for four hours at 90° C. while maintaining the pH at 12.3 by periodic addition of 50% aqueous sodium hydroxide. At the end of the reaction, the ph was lowered to 5.0 with hydrochloric acid. The product was purified by dialysis for 14 hours and then recovered by precipitation with ethanol in a Waring Blender. The dried product was found to contain 0.91% nitrogen by weight.

The above reaction was repeated in an identical manner except that the amount of N-(iso-butoxymethyl)a- crylamide was increased to 30 parts, the temperature lowered to 50° C., and the reaction time increased to 16 hours. At the end of the reaction, the reaction mixture was a gel. The product was recovered by alcohol precipitation without lowering the ph or using dialysis to remove impurities. The product was washed with ethanol and, upon analysis, was found to contain 1.79% nitrogen by weight.

EXAMPLE IV

This example illustrates the effect of sodium hydroxide level on the preparation of starch ether derivatives of this invention.

The starch ether derivatives designated as Nos. 16-18 in Table III were prepared as follows:

A total of 100 parts waxy miaze starch was suspended in a solution of 30 parts sodium sulfate and 0.75, 1.50, or 3.00 parts sodium hydroxide in 150 parts water to give suspensions having the indicated pH. Then 7.5 parts N-(iso-butoxymethyl)acrylamide were added to the suspension and the resulting mixture agitated at 40° C. for 16 hours. After completion of the reaction, the pH was lowered to 6.0 with 9.5% aqueous hydrochloric acid solution and the product recovered by filtration, washed with water, and dried. The nitrogen content of each product was then measured. The results, summarized in Table III, indicate increased reaction efficiency as the sodium hydroxide level is increased.

Table III

| Derivative No. | Amount of Sodium Hydroxide (% by weight, based on starch) | Reaction pH | Nitrogen Content (% by weight) |
|---|---|---|---|
| 16 | 0.75 | 11.3 | 0.15 |
| 17 | 1.50 | 11.7 | 0.23 |
| 18 | 3.00 | 12.3 | 0.34 |

EXAMPLE V

This example illustrates the preparation of the novel starch ether derivatives of this invention using calcium hydroxide as the alkaline catalyst.

A total of 100 parts corn starch was slurried in 125 parts water. Then 2 parts calcium hydroxide and 5 parts N-(iso-butoxymethyl)acrylamide were added and the resulting mixture, having a pH of 12.1, was agitated at 40° C. for 16 hours. The pH of the reaction mixture was then lowered from 12.0 to 5.0 with 10% aqueous hydrochloric acid solution and the starch product recovered by filtration, washed with water, and dried. Upon analysis, the product was found to contain 0.24% nitrogen, by weight.

EXAMPLE VI

This example illustrates the crosslinking properties at high solids of the starch ether derivatives of this invention.

The starch ether derivatives designated Nos. 19-21 in Table IV were prepared as follows:

A total of 100 parts waxy maize starch which had been acid-converted to a degree known in the trade as 85 fluidity was added to a solution of 1.5 parts sodium hydroxide and 30 parts sodium sulfate in 200 parts water. The pH of the resulting suspension was 11.7. Then the indicated amount of N-(iso-butoxymethyl)acrylamide was added and the resulting mixture agitated at 40° C. for 16 hours. After completion of the reaction, the pH was lowered to 6.0 with dilute hydrochloric acid and the products recovered by filtration, washed with water, and dried. The products were analyzed for nitrogen content and the results summarized in Table IV.

TABLE IV

| Derivative No. | Amount of N-(iso-butoxymethyl)-acrylamide (% by weight, based on starch) | Nitrogen Content (% by weight) |
|---|---|---|
| 19 | 1.5 | 0.11 |
| 20 | 4.5 | 0.20 |
| 21 | 7.5 | 0.21 |

Starch derivative Nos. 19-21 were cooked at 45% solids in a boiling water bath at pH 3.0, 5.0, and 7.0. No significant increase in viscosity was observed for any of the products during the ph 7.0 cooking period. At pH 5.0, there was a slight increase in viscosity during cooking of Derivative Nos. 20 and 21, indicating trace amounts of cross-linking. At pH 3.0, all of the samples crosslinked during cooking to give a rubbery mass. These results indicate that crosslinking of the starch derivatives of this invention can be controlled by adjusting the pH.

EXAMPLE VII

This example illustrates the crosslinking properties of the starch derivatives of this invention cooked at low solids. I. A total of 6 parts each of starch derivative Nos. 16-18 of Example IV was stirred in 90 parts water at pH 6.5-6.8. The resulting slurry was cooked in a boiling water bath for 20 minutes with agitation during the first few minutes. After 20 minutes, the dispersion was removed from the bath, evaluated at the elevated temperature, and then maintained at room temperature for 24 hours to be reevaluated. The dispersions at hot and ambient temperatures upon evaluation were found to be watery, opaque and smooth in all cases. The starch settled slightly out of the dispersions which were maintained at room temperature for 24 hours. These properties indicate that a small amount of crosslinking is present in the granular starch derivatives.

The above cook evaluations for the three starch derivatives were repeated in an identical manner except that the pH of the slurry was lowered to 3.0. Both the hot and cold cooks of each starch derivative were obtained as very soft gels or sets having substantial viscosity. No settling of starch from any of the starch dispersions occurred. In addition, all of the dispersions had a very strong set, i.e., resistance to flow, as determined by the following procedure: the dispersion is placed in a beaker covered with a rubber stopper through the center of which a hole has been drilled and a glass rod inserted which extends to the bottom of the beaker. When the rubber stopper and rod are carefully removed from the cooked starch dispersion, the void caused by removal of the rod will rapidly be filled in when the dispersion does not have set properties. If the dispersion displays set properties, the void will not be filled in or will be only partially filled in.

A control consisting of waxy maize starch base was cooked in an identical manner as above at pH 6.5 and 3.0 and was found to have no set or gel properties at either pH. II. A total of 7 parts of the starch derivative of Example V was stirred in 84 parts water at pH 6.5. The resulting slurry, when treated and evaluated as described above, was found to be very thin with a trace of the starch settling out of solution, indicating that only a very small amount of crosslinking is present in the starch derivative.

The above cook evaluation was repeated in an identical manner except that the pH of the slurry was lowered to 3.0. The resulting dispersion was found to be stable and viscous with no settling of starch. In addition, the dispersion had a very strong set.

Summarizing, this invention is seen to provide novel starch ether derivatives, the crosslinking properties of which may be altered by adjusting the pH of the cook and a process for the preparation of such derivatives.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. As a new composition of matter, a crosslinkable starch ether derivative prepared by reacting a starch base in water at pH 11-13 for 1-40 hours with about 1-100% by weight, based on dry starch, of an N-(alkoxymethyl)acrylamide wherein the alkoxy group has 1 to 4 carbon atoms, said reaction being carried out at a temperature of 20°-95° C. when said starch base is non-granular, and at a temperature of 20°-60° C. when said starch base is granular.

2. A process for preparing a crosslinkable starch ether derivative which comprises the steps of:
   (a) reacting a starch base in water at pH 11-13 for 1-40 hours with about 1-100% by weight of an N-(alkoxymethyl)acrylamide, based on dry starch, wherein the alkoxy group has 1 to 4 carbon atoms, said reaction being carried out at a temperature of 20°-90° C. when said starch base is non-granular, and at a temperature of 20°-60° C. when said starch base is granular; and
   (b) isolating the resultant starch ether derivative.

3. Claim 1 or 2 wherein a cook of said starch derivative at pH 3.0 provides a homogeneous, viscous dispersion of said derivative, with no settling of the starch out of solution.

4. Claim 1 or 2 wherein said N-(alkoxymethyl)acrylamide is N-(iso-butoxymethyl)acrylamide.

5. Claim 1 or 2 wherein said starch base is non-granular and said reaction is carried out at a temperature of 50°-70° C.

6. Claim 1 or 2 wherein said starch base is granular and said reaction is carried out at a temperature of 40°-55° C.

7. Claim 1 or 2 wherein said reaction is carried out for 10-24 hours at a pH of 12.0-12.5.

8. Claim 1 or 2 wherein said starch base is reacted with 2-10% by weight of said N-(alkoxymethyl)acrylamide.

9. The process of claim 2 wherein said reaction is not catalyzed by calcium hydroxide and takes place in the presence of 10-40% by weight of sodium sulfate, based on dry starch.

10. Claim 1 or 2 wherein said starch ether derivative is crosslinkable by cooking.

* * * * *